(12) United States Patent
Baumann et al.

(10) Patent No.: US 7,330,313 B2
(45) Date of Patent: Feb. 12, 2008

(54) TELESCOPE

(75) Inventors: Oliver Baumann, Aalen (DE); Klaus Felgenhauer, Wetzlar (DE); Stefan Gerth, Sinn (DE); Klaus Knupfer, Essingen (DE); Walter J. Schwab, Huettenberg (DE); Volker Tautz, Wetzlar (DE)

(73) Assignee: Hensoldt AG, Wetzlar (DE)

( * ) Notice: Subject to any disclaimer, the term of this patent is extended or adjusted under 35 U.S.C. 154(b) by 0 days.

(21) Appl. No.: 11/448,520

(22) Filed: Jun. 7, 2006

(65) Prior Publication Data

US 2007/0019294 A1    Jan. 25, 2007

(30) Foreign Application Priority Data

Jun. 9, 2005    (DE) ............... 10 2005 027 870

(51) Int. Cl.
*G02B 27/64* (2006.01)
*G02B 23/00* (2006.01)

(52) U.S. Cl. ............... 359/557; 359/399; 359/554

(58) Field of Classification Search ........ 359/554–557, 359/813–824, 399; 396/52–55; 348/208
See application file for complete search history.

(56) References Cited

U.S. PATENT DOCUMENTS

| | | | | |
|---|---|---|---|---|
| 3,577,205 A | * | 5/1971 | Hobrough | 250/214 VT |
| 3,728,948 A | * | 4/1973 | Fraser | 396/421 |
| 4,235,506 A | | 11/1980 | Saito et al. | 359/556 |
| 5,122,908 A | * | 6/1992 | Sporer | 359/557 |
| 5,917,653 A | | 6/1999 | Taniguchi | 359/557 |
| 6,067,194 A | * | 5/2000 | Stroemberg | 359/557 |
| 6,078,436 A | | 6/2000 | Hirunuma et al. | 359/694 |
| 6,191,888 B1 | | 2/2001 | Yamanouchi | 359/557 |
| 6,226,123 B1 | | 5/2001 | Kanai et al. | 359/557 |
| 6,549,337 B2 | * | 4/2003 | Iizuka et al. | 359/557 |

FOREIGN PATENT DOCUMENTS

| | | |
|---|---|---|
| DE | 1 547 129 | 12/1969 |
| DE | 2 419 532 | 11/1974 |
| EP | 1 239 317 A2 | 9/2002 |

* cited by examiner

*Primary Examiner*—Thong Q Nguyen
(74) *Attorney, Agent, or Firm*—Harness, Dickey & Pierce, P.L.C.

(57) ABSTRACT

A telescope has at least one barrel. At least three optical elements, namely an objective lens, an inverting system, and an eyepiece are arranged within the barrel along a longitudinal axis thereof one behind another. Further, shaking movements of the barrel are compensated for by moving at least one of the optical elements relative to the barrel. The objective lens is rigidly connected to the barrel. The inverting system together with the eyepiece constitutes a common assembly. At least a part of the assembly is adapted to be moved relative to the longitudinal axis. As an alternative, the inverting system and the eyepiece are rigidly connected to the barrel and at least a part of the objective lens is adapted to be moved relative to the longitudinal axis.

6 Claims, 4 Drawing Sheets

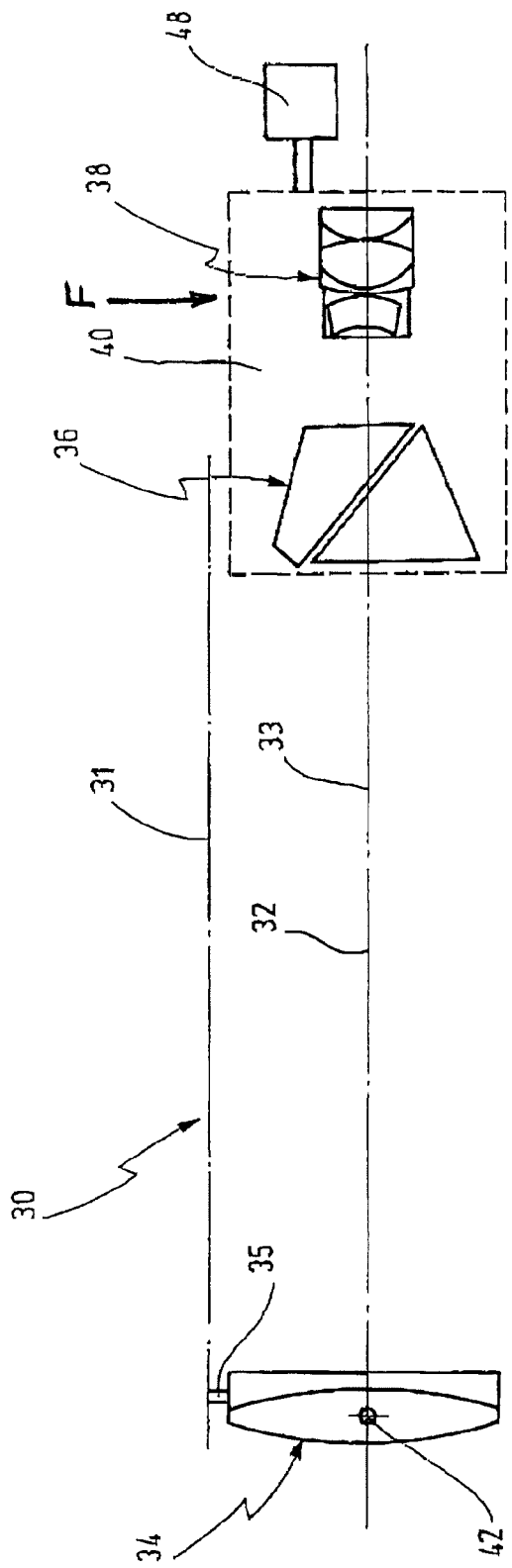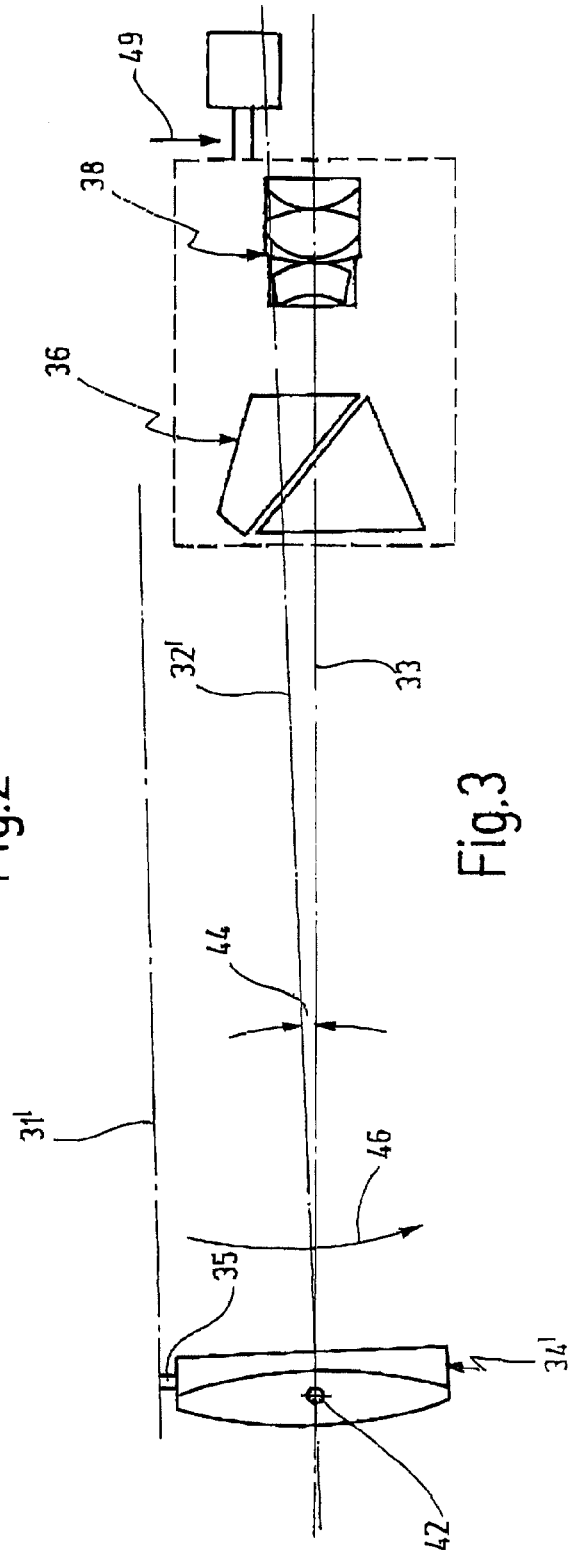
Fig.2
Fig.3

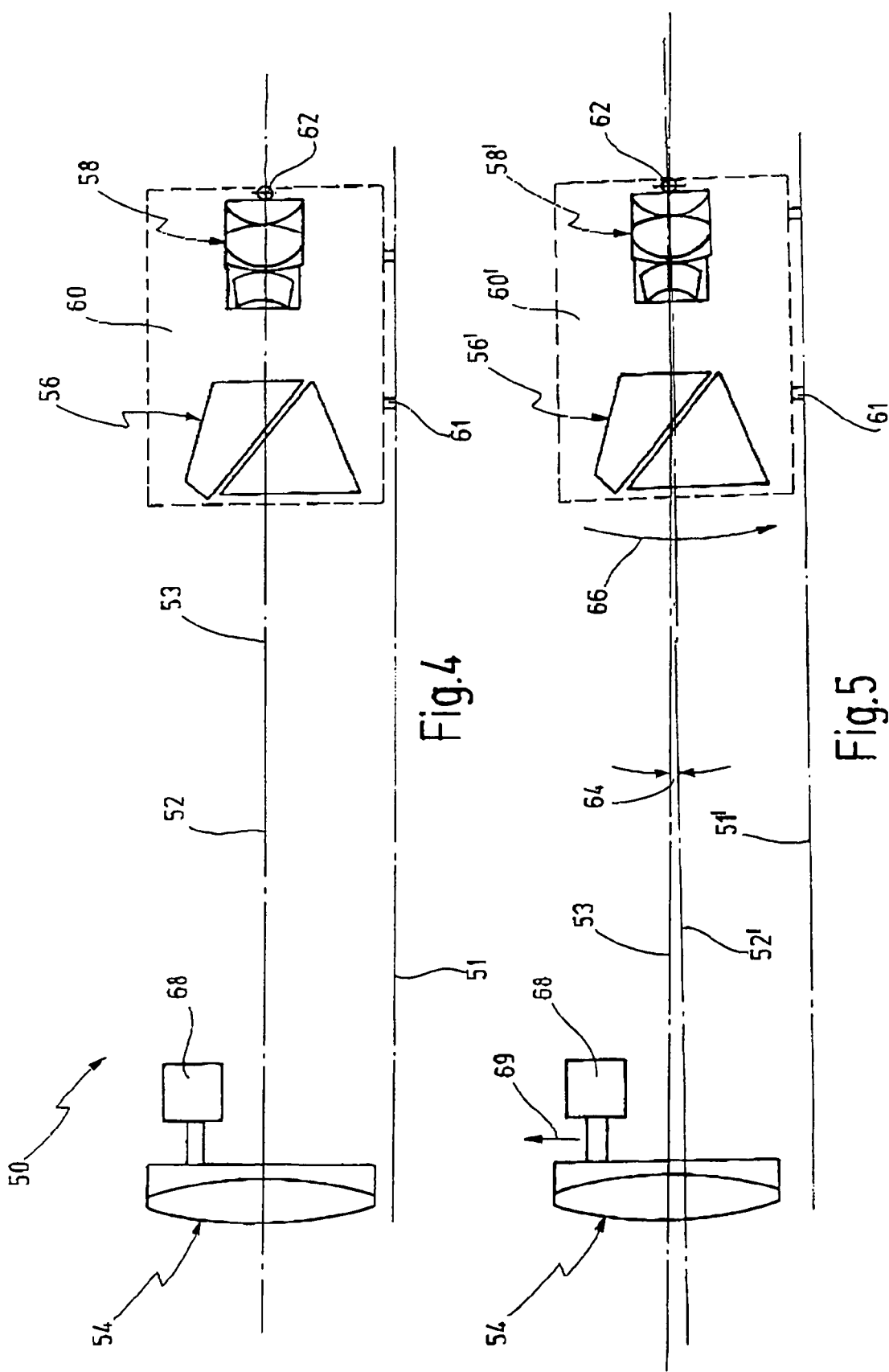

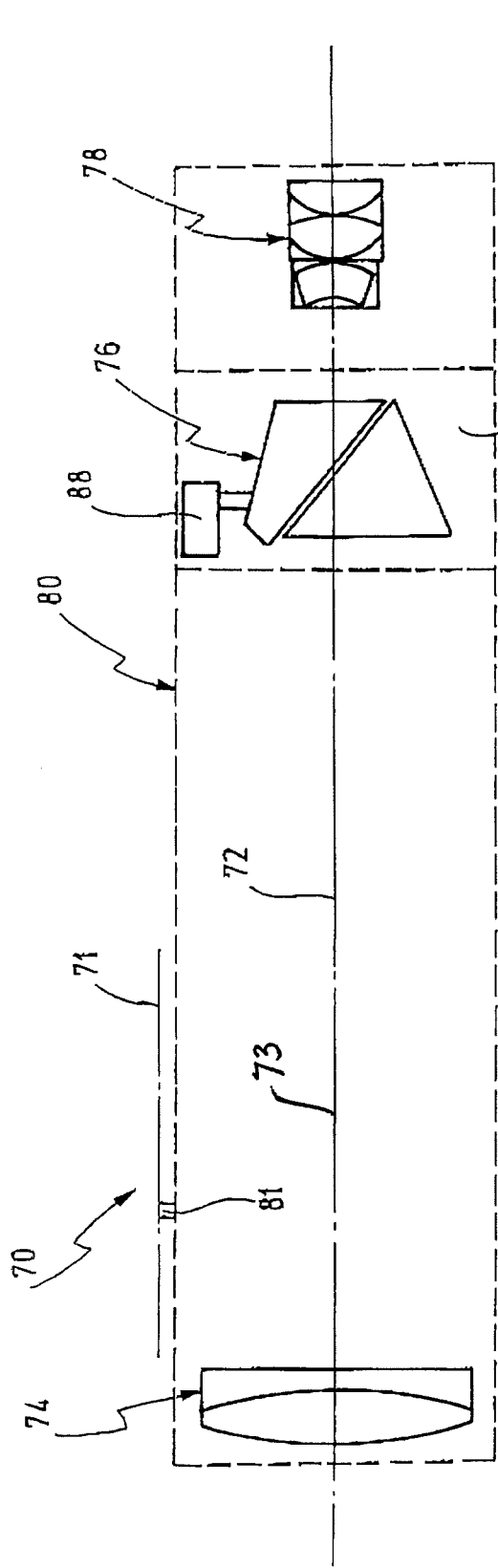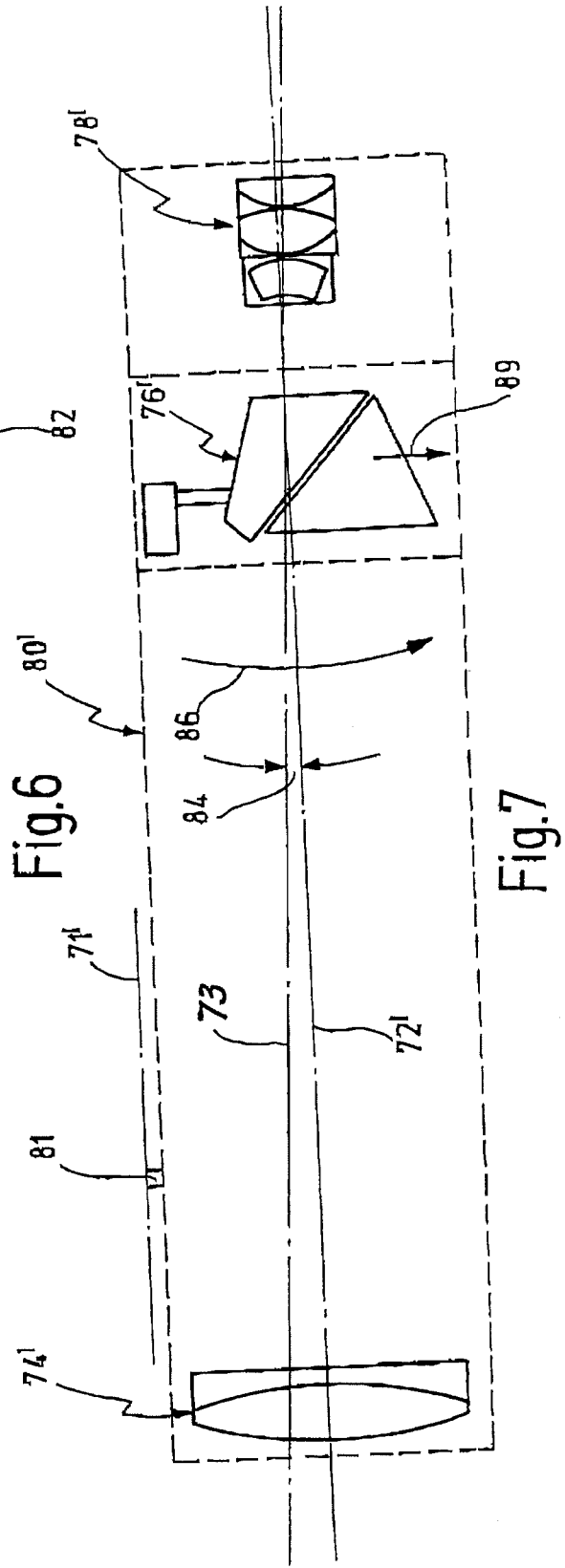

TELESCOPE

FIELD OF THE INVENTION

The invention, generally, is related to the field of telescopes.

More specifically, the invention is related to the field of monocular or binocular telescopes having means for compensating shaking movements in order to avoid blurred images.

Still more specifically, the invention is related to a telescope having at least one barrel, wherein at least three optical elements, namely an objective lens, an inverting system, and an eyepiece are arranged within the barrel along a longitudinal axis thereof one behind another, and comprising means for compensating shaking movements of the barrel by moving at least one of the optical elements relative to the barrel.

BACKGROUND OF THE INVENTION

When an object is viewed with a monocular or a binocular telescope without a support or stand or the like, there is always the risk of shaking movements blurring the image. The cause for such shaking movements may be from the inability of the user to hold the device steady, or from external influences, such as the force of strong wind, or the movement of a boat or airplane on which the user is riding.

All this has the effect that in spite of highly developed optical imaging systems the theoretical resolution and discernability of details on the object under observation may in practice not be fully taken advantage of.

It has turned out that from the six possible movements of a telescope, namely the three linear movements along axes of a Cartesian coordinate system as well as the three rotational movements about these axes, essentially only the rotational movements about the two axes orthogonal to the optical axis (direction of vision), i.e. the rotational movements about the vertical axis and about the transverse axis are responsible.

In order to avoid the problems discussed above, various suggestions have become known. Some known suggestions are based on a concept according to which optical elements are movably supported within the ray path of the telescope, and are stabilized by means of inertial devices, for example by gyros.

These prior art suggestions have the disadvantage that relatively large masses must be provided and moved, respectively. Such telescopes, therefore, are relatively heavy and must be manufactured with high precision.

For binoculars one has the additional problem that the stabilizing measures in the two barrels must be coordinated.

More recent suggestions utilize an active stabilization instead of the above discussed purely mechanic and passive stabilization. When doing so, sensors measure the shaking movement of the barrel or barrels, respectively. An electronic position control compensates the barrel movement by means of actuators generating an oppositely directed movement of optical elements within the ray path of the telescope.

U.S. Pat. No. 4,235,506 discloses a binocular telescope. In this prior art telescope there is an inverting system, namely a prism, arranged within each of the barrels. The two prisms are gimballed.

This telescope has the disadvantage that a compensation of shaking movements is not always possible in an optimal way.

German disclosure document DE 15 47 129 A discloses a periscope in a vehicle having means for displacing a prism to compensate vehicle movements. The prism is a unit separate from the eyepiece.

U.S. Pat. No. 6,078,436 discloses a device for compensating jitter movements in a binocular telescope. The device comprises a movable plate having two lenses. In each of the barrels the inverting system and the eyepiece configure a common assembly, however, for adjusting the pupillary distance only.

A similar device is disclosed in U.S. Pat. No. 5,917,653.

U.S. Pat. No. 6,191,888 discloses a binocular telescope with a device for compensating shaking movements in which both the eyepiece and the inverting system are rigidly connected to the barrel, whereas the objective lens is displaceable for compensating such movements.

Another binocular with an image-vibration compensation system is disclosed in U.S. Pat. No. 6,226,123.

SUMMARY OF THE INVENTION

It is, therefore, an object underlying the invention to provide a telescope of the type specified at the outset which overcomes the above-mentioned disadvantages. In particular, a telescope is provided which enables an effective compensation of shaking movements.

In a first embodiment of a telescope of the type specified at the outset, this object is achieved in that the objective lens is, preferably, rigidly connected to the barrel, that the inverting system together with the eyepiece constitutes a common assembly, and that at least a part of the assembly is adapted to be moved relative to the longitudinal axis.

In a second embodiment of a telescope of the type specified at the outset, this object is achieved in that the inverting system and the eyepiece are, preferably, rigidly connected to the barrel, and that at least a part of the objective lens is adapted to be moved relative to the longitudinal axis.

The object underlying the invention is, thus, entirely solved.

The afore-mentioned arrangements of optical elements being movable for compensating purposes have turned out to be particularly effective. They are relatively simple to manufacture and have a low weight.

In preferred embodiments of the invention, the assembly or the objective lens, respectively, are gimballed about a transverse axis and about a vertical axis, in particular in a pivotal point being located on the longitudinal axis which, further preferably, being located in the center point of the objective lens or in the area of the objective lens, respectively, in particular on the side of the eyepiece facing away from the inverting system.

Within the scope of the present invention one may use passive as well as active systems. The movement of the at least one optical element may, therefore, be effected passively by inertial forces, or actively by actuators.

Further advantages will become apparent from the description and the enclosed drawing.

The description of the invention is merely exemplary in nature and thus is subject to variation and change which do not depart from the teachings contained herein and which are therefore included within the proper scope of the invention.

BRIEF DESCRIPTION OF THE DRAWINGS

Embodiments of the invention are shown in the drawing and will be discussed in further detail throughout the subsequent description.

FIG. 2 shows a side elevational view of a first embodiment of the optical elements of the telescope of FIG. 1 being of importance in the context of the present invention, in a non-disturbed state;

FIG. 3 shows the view of FIG. 2, however, in a state disturbed by shaking movements;

FIG. 4 shows a side elevational view of a second embodiment of the optical elements of the telescope of FIG. 1 being of importance in the context of the present invention, in a non-disturbed state;

FIG. 5 shows the view of FIG. 4, however, in a state disturbed by shaking movements;

FIG. 6 shows a side elevational view of a third embodiment of the optical elements of the telescope of FIG. 1 being of importance in the context of the present invention, in a non-disturbed state; and FIG. 7 shows the view of FIG. 6, however, in a state disturbed by shaking movements.

DETAILED DESCRIPTION OF THE PREFERRED EMBODIMENTS

Figure 1:
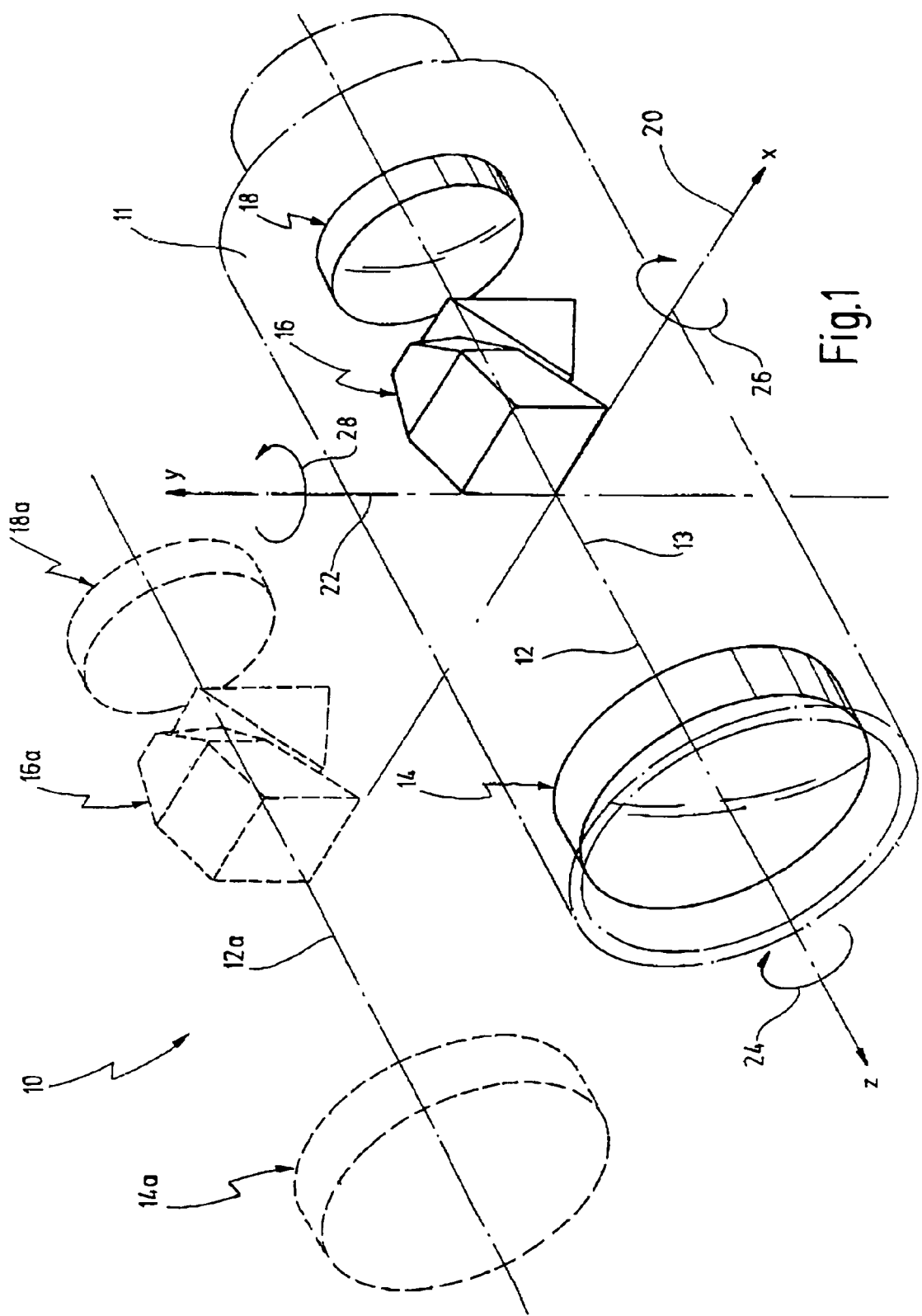
FIG. 1 shows an extremely schematic and perspective representation of a telescope as may be used in the context of the present invention.

In FIG. 1 reference numeral 10 as a whole designates a telescope. Telescope 10 may be a monocular telescope, as indicated with solid lines, or it may be a binocular telescope, as indicated additionally by dashed lines, which the corresponding elements and features identified by reference numerals 12, 14, 16 and 18 labeled with the addition of an "a". The following description of embodiments of the invention is based on a monocular telescope, however, without thereby limiting the scope of the invention.

Telescope 10 has a barrel indicated at 11. Barrel 11 has a longitudinal axis 12, also designated as z-axis.

FIG. 1 shows an undisturbed state of telescope 10 in which there is no shaking movement. In that state an optical axis 13 coincides with longitudinal axis 12. At least three optical elements are arranged along axes 12, 13 one after another, namely, as seen from the object side, an objective lens 14, an inverting system 16, and an eyepiece 18. In all embodiments shown, inverting system 16 is, as an example, configured as a Pechan prism arrangement. In further embodiments of the invention one may still provide a fourth optical element, namely one more prism (not shown), between inverting system 16 and eyepiece 18, for allowing a variation of the eyepiece distance.

Besides the already mentioned longitudinal or z-axis 12, FIG. 1 further shows a transverse or x-axis 20 as well as a vertical or y-axis 22. With regard to these axes, telescope 10 may effect linear movements along these three Cartesian coordinate axis directions. Further, there are three rotational movements about said axes 12, 20, and 22, as indicated by arrows 24, 26, and 28. In practice it are essentially the rotational movements about x-axis 20 and y-axis 22, indicated by arrows 26 and 28 which are noticeable with regard to malfunctions caused by shaking movements.

FIGS. 2 and 3 show a first embodiment of the invention.

A telescope 30 has a barrel as schematically indicated at 31. Barrel 31 has a longitudinal axis shown at 32. An optical axis is designated 33. An objective lens 34 is again positioned within barrel 31. Objective lens 34 is rigidly connected to barrel 31 by means of a connecting element 35, being, for example, and appropriate mount. Behind objective lens 34 there is positioned an inverting system 36 and, again, an eyepiece 38.

Inverting system 36 and eyepiece 38 together configure an assembly 40, i.e. they are rigidly connected one with the other and are movable together. In this embodiment, assembly 40 with inverting system 36 and eyepiece 38 define the optical axis 33.

Assembly 40 is seated in a pivotal point 42 by means of a lever (not shown). Pivotal point 42 is located on longitudinal axis 32, namely in the center point of objective lens 34. The seating within pivotal point 42 is gimballed and allows a rotation of assembly 40 both about x-axis 20 and about y-axis 22. Assembly 40, however, may also be gimballed only partially, for example with respect to all components of inverting system 36 and of eyepiece 38, except the last individual lens.

FIG. 2 shows the undisturbed sate in which optical axis 33 coincides with longitudinal axis 32 of barrel 31. FIG. 3, in contrast, shows the disturbed state in which a shaking movement has caused a rotation of barrel 31 about x-axis 20. An angle of rotation is indicated at 44 and may, for example, amount to about 2°. In FIG. 3, as well as in FIGS. 5 and 7, the disturbed state is symbolized by the addition of an apostrophe to the reference numerals of the components involved.

Due to the rotation, telescope 30 with its barrel 31 makes a downward tipping movement at its front end about angle 44, as indicated by an arrow 46. Thereby, longitudinal axis 32 is pivoted to 32'. Assembly 40 with inverting system 36 and eyepiece 38, however, being gimballed within pivotal point 42, maintains its orientation, and, thereby, compensates the shaking movement.

According to a first alternative of this embodiment this is achieved passively by resiliently seating corresponding inertial masses, as indicated in FIG. 2 by the arrow F, such that assembly 40 maintains its orientation already due to this mass inertia.

According to a second alternative, however, the shaking movement is measured by appropriate sensors (not shown) and processed. By means of actuators, one of which being indicated at 48 in FIGS. 2 and 3, a movement compensation is effected for assembly 40, as indicated by an arrow 49.

The active and the passive approaches may also be combined as appropriate.

FIGS. 4 and 5 show a second embodiment of the invention.

A telescope 50 has a barrel as schematically indicated at 51. Barrel 51 has a longitudinal axis shown at 52. An optical axis is designated 53. An objective lens 54 is again positioned within barrel 51. Behind objective lens 54 there is an inverting system 56, and behind inverting system 56, there is again an eyepiece 58.

In this embodiment, objective lens 54 is not rigidly connected to barrel 51. However, it does define optical axis 53 for this embodiment. Inverting system 56 and eyepiece 58 again configure a common assembly 60. Assembly 60 is rigidly connected with barrel 51 via a connecting element 61.

Objective lens 54 is seated in a pivotal point 62 by means of a lever (not shown). Pivotal point 62 is located on longitudinal axis 52, namely in the area of eyepiece 58, preferably on the side of eyepiece 58 facing away from inverting system 56. The seating within pivotal point 62 is gimballed and allows a rotation of objective lens 54 about x-axis 20 and y-axis 22. For this embodiment it holds likewise true that the gimballed element, being objective lens 54 for this embodiment, may be gimballed only partially. If, for example, objective lens 54 consists of two individual lenses, then it may be sufficient to gimbal only one of these two lenses.

FIG. 4 shows the undisturbed state in which optical axis 53 coincides with longitudinal axis 52 of barrel 51. FIG. 5, in contrast, shows a disturbed state in which a shaking movement has effected a rotation of barrel 51 about x-axis 20. An angle of rotation is indicated at 64 and may also here amount to about 2°.

Due to the rotation, telescope 50 with its barrel 51 makes a downward tipping movement at its front end about angle 64, as indicated by an arrow 66. Thereby, longitudinal axis 52 is pivoted to 52'. Objective lens 54, however, being gimballed within pivotal point 62, maintains its orientation, and, thereby, compensates the shaking movement.

In this embodiment, too, one may compensate passively or actively. The actuators for rotating objective lens 54, required for the second option, are indicated at 68, 69.

FIGS. 6 and 7, finally, show a third embodiment of the invention.

A telescope 70 has a barrel as schematically indicated at 71. Barrel 71 has a longitudinal axis shown at 72. An optical axis is designated 73. An objective lens 74 is again positioned within barrel 71. Behind objective lens 74 there is an inverting system 76, and behind inverting system 76, there is again an eyepiece 78.

In this embodiment, objective lens 74 and eyepiece 78 together configure a common assembly 80. Assembly 80 is rigidly connected to barrel 71 by means of a connecting element 81. In this embodiment, assembly 80 defines the optical axis 73. Inverting system 76 is positioned within a department 82 of assembly 80.

Inverting system 76 is slidingly seated within department 82. The seating allows a displacement of inverting system 76 along x-axis 20 and along y-axis 22.

FIG. 6 shows the undisturbed state in which optical axis 73 coincides with longitudinal axis 72 of barrel 71. FIG. 7, in contrast, shows a disturbed state in which a shaking movement has effected a rotation of barrel 71 about x-axis 20. An angle of rotation is indicated at 84 and may also amount to about 2°.

Due to the rotation, telescope 70 with its barrel 71 makes a downward tipping movement at its front end about angle 84, as indicated by an arrow 86. Thereby, longitudinal axis 72 is pivoted to 72'. Inverting system 76 is now displaced along the x- and/or y-directions, and, thereby, compensates the shaking movement.

In this embodiment, too, one may compensate passively or actively. The actuators for displacing inverting system 76, required for the second option, are indicated at 88, 89.

The Invention claimed is:

1. A telescope having at least one barrel, wherein at least three optical elements, namely an objective lens, an inverting system, and an eyepiece are arranged within said barrel along a longitudinal axis thereof one behind another, and said inverting system together with said eyepiece constitute a common assembly separate from said barrel, said telescope comprising means for compensating shaking movements of said barrel by moving at least a part of said assembly relative to said barrel and relative to said longitudinal axis, and further wherein said objective lens is rigidly connected to said barrel.

2. The telescope of claim 1, wherein said assembly is gimballed about a transverse axis and about a vertical axis.

3. The telescope of claim 2, wherein said assembly is gimballed in a pivotal point being located on said longitudinal axis.

4. The telescope of claim 3, wherein said pivotal point is located in a center point of said objective lens.

5. The telescope of claim 1, wherein said movement of said part of said assembly is effected passively by inertial forces.

6. The telescope of claim 1, wherein said movement of said part of said assembly is effected actively by actuators.

* * * * *